US009516680B2

(12) United States Patent
Duncan et al.

(10) Patent No.: US 9,516,680 B2
(45) Date of Patent: Dec. 6, 2016

(54) SHARING WIRELESS CONNECTION PROFILES BETWEEN MULTIPLE OPERATING SYSTEMS

(75) Inventors: Robert Duncan, Portland, OR (US); Giora Rayzman, Portland, OR (US); Venkata Vallabhu, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 13/996,971

(22) PCT Filed: Dec. 28, 2011

(86) PCT No.: PCT/US2011/067659
§ 371 (c)(1),
(2), (4) Date: Oct. 9, 2014

(87) PCT Pub. No.: WO2013/101000
PCT Pub. Date: Jul. 4, 2013

(65) Prior Publication Data
US 2015/0031346 A1    Jan. 29, 2015

(51) Int. Cl.
*H04W 76/02* (2009.01)
*H04W 8/22* (2009.01)
(Continued)

(52) U.S. Cl.
CPC .............. *H04W 76/02* (2013.01); *H04W 8/22* (2013.01); *H04W 8/18* (2013.01); *H04W 88/06* (2013.01)

(58) Field of Classification Search
CPC ........ H04W 4/021; H04W 4/22; H04W 76/02; H04W 8/22; H04W 8/18; H04W 88/06
(Continued)

(56) References Cited

U.S. PATENT DOCUMENTS

2003/0126298 A1* 7/2003 Redford .............. H04L 12/2898
709/250

FOREIGN PATENT DOCUMENTS

| KR | 100737518 B1 | 7/2007 |
| KR | 2009044093 A * | 5/2009 |
| KR | 1020090044093 A | 11/2010 |

OTHER PUBLICATIONS

International Application Serial No. PCT/US2011/067659, Search Report mailed May 31, 2012, 3 pgs.
(Continued)

*Primary Examiner* — George Eng
*Assistant Examiner* — Jing Gao
(74) *Attorney, Agent, or Firm* — Schwegman Lundberg & Woessner, P.A.

(57) ABSTRACT

Embodiments of a system, apparatus and method for sharing wireless connection profiles between multiple OSs are generally described herein. In some embodiments, a first wireless connection may be established between a wireless communication device and an access point of a wireless network or one or more other devices of a peer-to-peer networking group while the wireless communication device is running in an OS. A wireless connection profile for the first wireless connection may be stored in a shared profiles storage associated with the device, and then may be retrieved from the shared profiles storage responsive to the device being booted in a different OS. A second wireless connection may be automatically established between the device booted in the different OS and the access point or the one or more other devices using the wireless connection profile retrieved from the shared profiles storage.

20 Claims, 3 Drawing Sheets

(51) Int. Cl.
*H04W 88/06* (2009.01)
*H04W 8/18* (2009.01)

(58) Field of Classification Search
USPC .......................................... 455/418
See application file for complete search history.

(56) References Cited

OTHER PUBLICATIONS

International Application Serial No. PCT/US2011/067659, Written Opinion mailed May 31, 2012, 5 pgs.

* cited by examiner

SHARING WIRELESS CONNECTION PROFILES BETWEEN MULTIPLE OPERATING SYSTEMS

PRIORITY APPLICATION

This application is a U.S. National Stage Application under 35 U.S.C. 371 from International Application No. PCT/US2011/067659, filed Dec. 28, 2011, which is hereby incorporated by reference in its entirety.

TECHNICAL FIELD

Embodiments pertain to wireless communications. Some embodiments relate to establishing a wireless network connection between a wireless communication device and an access point (AP) of a wireless network or a peer-to-peer networking group.

BACKGROUND

One phenomenon with communicating data over a wireless network connection is numerous wireless communication devices, such as personal computers (PCs), notebooks, netbooks, tablet PC, servers, cell phones, personal digital assistants (PDAs), televisions (TVs) or set top boxes, etc., may utilize more than one operating system (OS) to provide the best possible user experience and such a trend is growing. This phenomenon is driven, for example, by a long boot time of a main OS, such as Windows. The problem of the long boot time can be amplified if the number of applications installed in the main OS is large. In such a multi-OS environment, if a user wants a quick access to limited functionalities of her device, such as web-browsing, email checking, or media playing, and do not wish to wait for the long boot time required to boot her device in the main OS, the user may boot her device in a Fast Boot OS first and establish a wireless connection in the Fast Boot OS.

To establish the wireless connection, for example, the wireless communication device identifies available APs of one or more networks, or one or more other devices of a peer-to-peer networking group, that are available from a location where the device is currently located. The device selects one of the available APs as a target access point or one of the one or more other devices of the peer-to-peer networking group as a target device. Then, the device establishes a wireless connection with the target access point or target device, based on an input from the user. Accordingly, for these regular connection operations, the device needs to receive various user initiations, such as scanning through the available APs or peer-to-peer networking group devices identified by the device, choosing one of them as the target access point or target device, and issuing a request to connect to the target access point or target device. The device further needs to receive wireless connection credentials from the user, such as a network connection identification (e.g., service set identifier (SSID)) or security related information (e.g., WPS (Wireless Protected Setup) key), in order to generate a wireless connection profile for the wireless connection between the device and the target access point or target device.

Typically, the multi-OS environment allows the device that is booted in the Fast Boot OS to be rebooted into the main OS later when the user decides to access an entire set of applications installed in the main OS and vice versa. However, under the existing technology, upon the device being rebooted into a new OS, such as the main OS, different from a previously booted-in OS, such as the Fast Boot OS, the device cannot utilize the wireless connection credentials used for the wireless connection established in the previously booted-in OS. This forces the user to go through the same wireless connection process again to reconnect her device to the same access point or peer-to-peer networking group device(s) that her device was previously connected to before the switch into the new OS. These are cumbersome and time-consuming processes for the user and, in turn, degrades user experiences in using her device in the multi-OS environment. Thus, there are general needs for systems and methods that allow sharing wireless connection profiles between multiple operating systems.

DETAILED DESCRIPTION

Figure 1:
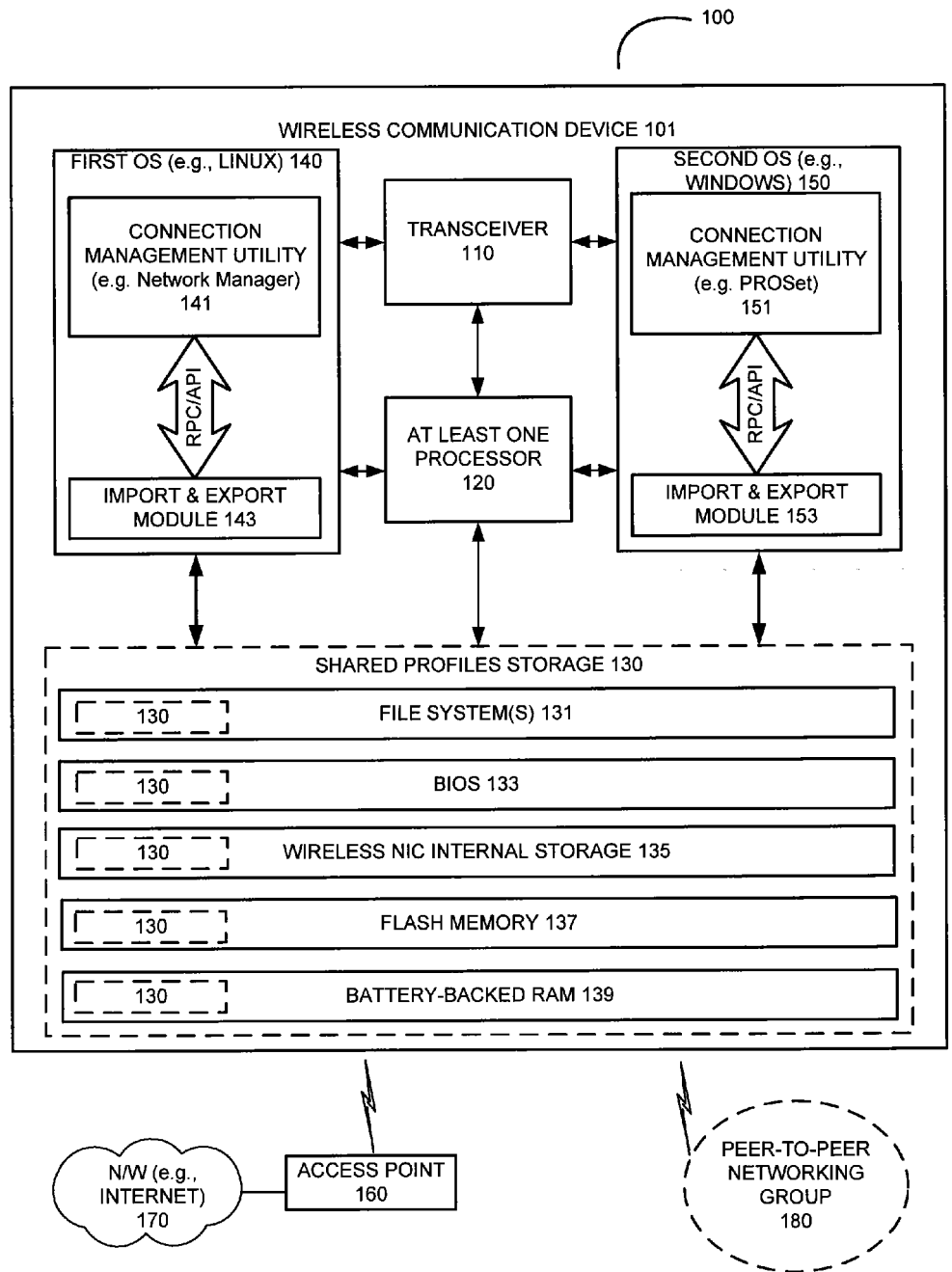
FIG. 1 is a block diagram of a system and apparatus in accordance with various embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various embodiments described herein may operate to share wireless connection profiles between multiple OSs to establish a wireless connection in a wireless network or peer-to-peer networking group. In some embodiments, a first wireless connection may be established between a wireless communication device and an access point of the wireless network or one or more devices of the peer-to-peer networking group while the wireless communication device is running in a first OS. A wireless connection profile for the first wireless connection may be generated and stored in a shared profiles storage associated with the wireless communication device. The shared profiles storage may be accessible by a plurality of OSs. The wireless connection profile may be retrieved from the shared profiles storage responsive to the wireless communication device being booted in a second OS different from the first OS. A second wireless connection may then be automatically established between the wireless communication device booted in the second OS and the access point or the one or more other devices of the peer-to-peer networking group using the wireless connection profile retrieved from the shared profiles storage.

In some embodiments, a wireless communication device may comprise a shared profiles storage and at least one processor. The shared profiles storage may be configured to store one or more wireless connection profiles accessible by a plurality of operating systems (OSs) including a first OS and a second OS. The at least one processor may be configured to run an import and export module. The import and export module may be configured to retrieve a wireless connection profile from the shared profiles storage responsive to the wireless communication device being booted in the second OS. The wireless connection profile may be previously stored in the shared profiles storage responsive to a first wireless connection being established between the wireless communication device and an access point of a wireless network or one or more other devices of a peer-to-peer networking group while the wireless communication device is running in the first OS.

In some embodiments, a wireless communication system may comprise a wireless transceiver, a shared profiles storage to store one or more wireless connection profiles accessible by a plurality of operating systems (OSs) including a first OS and a second OS. The wireless communication system may also comprise at least one processor to run an import and export module. The import and export module may be configured to retrieve a wireless connection profile from the shared profiles storage responsive to the wireless communication system being booted in the second OS. The wireless connection profile may be previously stored in the shared profiles storage responsive to a first wireless connection being established between the wireless communication system and an access point of a network or one or more devices of a peer-to-peer networking group while the wireless communication system is running in the first OS. The at least one processor may be configured to import the wireless connection profile retrieved from the shared profiles storage to a connection management utility associated with the second OS.

In the following description, numerous examples having example-specific details are set forth to provide an understanding of example embodiments. It will be evident, however, to those skilled in the art, after reading this disclosure, that the present examples may be practiced without these example-specific details, and/or with different combinations of the details than are given here. Thus, specific embodiments are given for the purpose of simplified explanation, and not limitation. Various embodiments that incorporate these mechanisms are described below in more detail.

FIG. 1 is a block diagram of a system 100 for sharing wireless connection profiles among multiple OSs according to various embodiments. The system 100 may comprise a wireless communication device 101 that may be wirelessly connected to an access point 160 of a network, such as the Internet, 170 or to one or more other devices (not shown in FIG. 1) of a peer-to-peer networking group 180. Here, it can be seen that the wireless communication device 101 may comprise a transceiver 110, at least one processor 120, and a shared profiles storage 130.

The wireless communication device 101 may also comprise a plurality of OSs, including a first OS 140 and a second OS 150 different from the first OS 140. In some embodiments, the plurality of OSs may comprise OSs from different vendors or organizations, such as Windows, Linux, FreeBSD, vxWorks or ThreadX, etc. Yet, in some embodiments, the plurality of OSs, including the first and second OSs 140 and 150, may comprise different versions of the same OS. For example, in one embodiment, each of the different OSs may comprise one of the Windows family of OSs, such as Windows 7, Windows Vista, Windows 8, or Windows XP, etc.). Likewise, each of the different OSs may comprise one of the Linux family of OSs, such as Android or Chrome, or one of the FreeBSD family of OSs, such as OpenBSD, NetBSD and so on. It is noted that although various OSs are listed as an example, the teachings of various embodiments described herein are not limited to any particular OSs. Thus, various embodiments employing additional OSs may be realized, still providing the same functions.

Referring to FIG. 1, in some embodiments, each of the plurality of OSs may comprise a connection management utility (e.g. Network Manager, connman or wpa_supplicant on Linux, or PROSet on Windows, etc.) and/or a import and export module. For example, as shown in FIG. 1, the first OS 140 may comprise the connection management utility 141 and the import and export module 143, and the second OS 150 may comprise the connection management utility 151 and the import and export module 153.

The transceiver 110 may be configured to transmit or receive a wireless signal to or from the access point 160 or one or more other devices (not shown in FIG. 1) of the peer-to-peer networking group 180. The shared profiles storage 130 may be accessible by the plurality of OSs and configured to store one or more wireless connection profiles for a wireless connection between the wireless communication device 101 running in a corresponding one of the plurality of OSs and the access point 160 or the one or more other devices of the peer-to-peer networking group 180.

For example, in some embodiments, for example, a wireless connection profile may be stored in the shared profiles storage 130 responsive to a first wireless connection being established between the wireless communication device 101 and the access point 160 or the one or more other devices of the peer-to-peer networking group 180 while the wireless communication device 101 is running in the first OS 140. In some embodiments, the wireless connection profiles may be stored in the shared profiles storage 130 such that the wireless connection profiles are automatically accessible by all of the plurality of OSs associated with the wireless communication device 101.

Yet, in some embodiment, the wireless connection profiles may be stored in the shared profiles storage 130 such that the profiles are accessible only by a subset of the plurality of OSs, such as the first and second OSs 140 and 150 only, or the first OS 140 and a third or fourth OS (not shown in FIG. 1) only and so on. In such a case, for example, in one embodiment, each record in the shared profiles storage 130 associated with a corresponding wireless connection profile may further comprise information indicating the subset of the plurality of OSs. Further, in one embodiment, when saved in the shared profiles storage 130, the wireless connection profile may be registered as available for sharing among the subset of OSs.

In some embodiments, for example, the subset of OSs may comprise different versions of the same OS (e.g., Windows 7, Windows Vista, Windows 8, or Windows XP, etc.), OSs from different vendors or organizations (e.g., Window, Linux, vxWorks, ThreadX, or FreeBSD, etc.) or any combination thereof. More information is described with respect to FIG. 2 regarding the features of limiting access to the wireless connection profile(s) stored in the shared profiles storage 130 to the subset of OSs.

In some embodiments, the at least one processor 120 may be configured to run import and export modules associated with a corresponding one of the plurality of OSs, such as the import and export modules 143 and 153 for the first and second OSs 140 and 150, respectively. The import and export module associated with a corresponding OS may be configured to retrieve a wireless connection profile from the shared profiles storage 130 responsive to the wireless communication device 101 being rebooted in a new OS. For example, continuing with the above example, the import and export module 153 associated with the second OS 150 may be configured to retrieve the wireless connection profile from the shared profiles storage 130 responsive to the wireless communication device 101 being rebooted in the second OS 150 from the first OS 140.

In some embodiment, the at least one processor 120 may further configured to automatically establish a second wireless connection between the wireless communication device 101 booted in the second OS 150 and the access point 160 or one or more other devices of the peer-to-peer networking group 180 using the wireless connection profile retrieved from the shared profiles storage 180. This allows the connection management utility 151 associated with the second OS 150 to override regular wireless connection operations or algorithms, such as ones performed to establish the first wireless connection.

In some embodiments, different wireless connection management schemes may employ different algorithms or operations in the order of user or system preference to select a wireless connection profile to be used for an attempt to establish a new wireless connection. For example, the algorithms or operations may first attempt for the access point most recently (or frequently) visited by the user within a specified time period, and then the next recently (or frequently) visited access point and so on, or any combination thereof. In such a case, the wireless connection profile sharing schemes according to various embodiments allow overriding the scheme of first attempting for the most recently (or frequently) visited access point, for example, by first attempting the access point that was previously (and/or most recently) accessed by other OSs.

In some embodiments, the import and export module 153 may be configured to check whether the wireless connection profile is registered as available for the second OS 150, and to retrieve the wireless connection profile from the shared profiles storage 130 based on a determination that the wireless connection profile is registered as available for the second OS 150. In some embodiments, the import and export module 153 may be configured to refrain from retrieving the wireless connection profile from the shared profiles storage 130 based on a determination that the wireless connection profile is not registered as available for the second OS 150.

In some embodiments, the import and export module 143 associated with the first OS 140 may be configured to export the wireless connection profile for the first wireless connection from the connection management utility 141 to the shared profiles storage 130. In some embodiments, the import and export module 153 associated with the second OS 150 may be configured to import the wireless connection profile retrieved from the shared profiles storage 130 to the connection management utility 151.

In some embodiments, each of the import and export modules 143 and 153 may comprise a separate entity from each other and be dedicated to a corresponding OS. In some embodiments, the import and export modules 134 and 153 may comprise a single entity universally shared by a full set of the plurality of OSs. In some embodiments, the import and export modules 134 and 153 may be a single entity partially shared by a subset of the plurality of OSs, such as the first and second OSs 140 and 150 or any subgroup of the plurality of OSs.

In such a case of the partial sharing, in some embodiments, the wireless communication device 101 may comprise a plurality of import and export modules, each import and export module handling only a corresponding subset of the plurality OSs. In some embodiments, each subset of the plurality of OSs that will share a corresponding import and export module may be determined, automatically or interactively with a user, based on version or vendor (or organization) information for corresponding OSs in the subset. For example, in some embodiments, only different versions of the Linux family of OSs, including Android or Chrome, may share one import and export module (e.g., the import and export module 143) while different versions of the Windows family of OSs, such as Windows 7, Windows Vista, Windows 8, or Windows XP, may share a different import and export module (e.g., the import and export module 153) and so on.

In some embodiments, the shared profiles storage 130 may be accessible by each of the plurality of OSs, including the first and second OSs 140 and 150. In some embodiments, the shared profiles storage 130 may comprise at least one portion of any non-volatile memory, such as a file system 131, a BIOS (basic input/output system) 133, a wireless NIC (network interface card) internal storage 135, a flash memory 137, or a battery backed RAM (random access memory) 139, etc., or any combination thereof. For example, in one embodiment, the shared profiles storage 130 may comprise a location on the file system 131 (e.g., one or more shared partitions and/or directories), a location in memory reserved by the BIOS 133 (e.g., when BIOS optimizations for quick OS switching are implemented), a location in the wireless NIC's internal memory 135 (e.g., when complete separation is desired between the OS s and BIOS reserved memory is not available).

In some embodiments, at least one of the first and second wireless connections with the access point 160 may be established in accordance with the IEEE 802.11 and/or the IEEE 802.16 families of standards including the 802.11-2007 and 802.11n standards and revisions thereof. In some embodiments, at least one of the first and second wireless connections with the one or more other devices of the peer-to-peer networking group 180 may be established in accordance with the Wi-Fi Direct standard and/or the Bluetooth standard. Some embodiments may be applicable to wireless connections established between devices of 3GPP LTE networks.

In some embodiments, at least one wireless connection profile stored in the shared profiles storage 130 may comprise a network connection profile generated in accordance with at least one of the IEEE 802.11, IEEE 802.16, Wi-Fi Direct or Bluetooth communication techniques. For example, in one embodiment, the network connection profile may comprise information indicating at least one of a network identification (e.g., SSID), a type of security employed by the network, security credentials or a channel the network was previously using, etc. In one embodiment, this information may be stored in an encrypted or proprietary format.

In some embodiments, the first OS 140 may comprise one of a fast boot OS and a main OS, and the second OS 150 comprises the other OS. The main OS may be an OS that includes a full suite of applications that the user has ever used. The fast boot OS may be a light-weight OS that includes only a subset of the full suite of applications, such as applications for web browsing, email reading/writing, or media playing, etc. The fast boot OS, being more light-weight and often different in implementation, has advantage over the main OS in that, for example, it boots (starts) up significantly more quickly than the main OS.

It is noted that although the functions of the wireless communication device 101 and its components, such as the connection management utilities 141 and 151 and the import and export modules 143 and 153, are explained in the context where the wireless communication device 101 is first booted in the first OS 140 and then rebooted in the second OS 150, one of ordinary skill in the art will recognize that substantially the same functions may be provided regardless of the order in which the wireless communication device 101 is booted in the plurality of OSs, such as being booted in the second OS 150 first and then rebooted in the first OS 140 and so on.

Each of the modules described above with respect to FIG. 1 may be implemented by hardware (e.g., circuit), firmware, software or any combinations thereof. Although each of the modules is described above as a separate module, the entire modules or some of the modules in FIG. 1 may be implemented as a single entity (e.g., module or circuit) and still maintain the same functionality. Still further embodiments may be realized. Some of these may include a variety of methods. The system 100 and apparatus 101 in FIG. 1 can be used to implement, among other things, the processing associated with the methods 200 of FIG. 2 discussed below.

Figure 2:
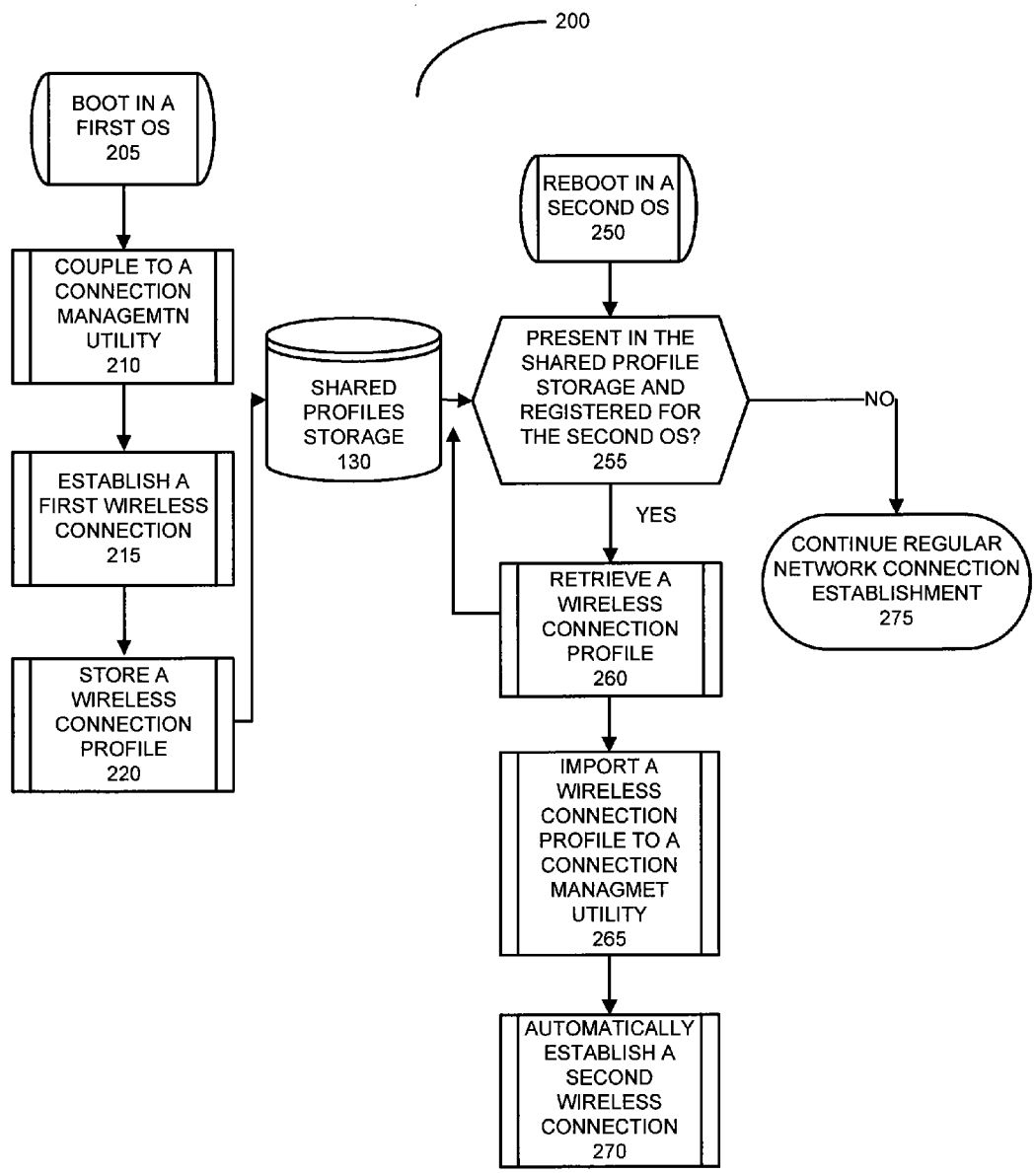
FIG. 2 is a flowchart illustrating the operation of the system and apparatus in accordance with various embodiments.

FIG. 2 is a flow diagram illustrating methods 200 of sharing wireless connection profiles among multiple OSs according to various embodiments. The methods 200 may be performed by processing logic that may comprise hardware (e.g., dedicated logic, programmable logic, microcode, etc.), such as the at least one processor 130, software (such as run on a general purpose computing system or a dedicated machine), firmware, or a combination of these. It is noted that although the methods 200 are explained below with respect to the system 100 and/or wireless communication device 101 in FIG. 1 for convenient understanding, those skilled in the art will recognize that the methods 200 may be performed by other systems and/or devices that provide substantially the same functionalities as the system 100 and/or wireless communication device 101.

In some embodiments, the methods 200 may begin at block 205 with booting the wireless communication device 101 in the first OS 140. At block 210, the wireless communication device may then be communicatively coupled to the connection management utility 141 associated with the first OS 140. At block 215, a first wireless connection may be established between the wireless communication device 101 and the access point 160 of the network 170 or one or more other devices of the peer-to-peer networking group 180 while the wireless communication device 101 is running in the first OS. At block 220, a wireless connection profile corresponding to the first wireless connection may be stored in the shared profiles storage 130, for example, by the import and export module 143 associated with the first OS 140 such that the wireless connection profile is accessible by the second OS 150.

In some embodiments, in storing the wireless connection profile in the shared profiles storage 130, the wireless connection profile may be exported from the connection management utility 141 associated with the first OS to the shared profiles storage 130. In some embodiments, in storing the wireless connection profile in the shared profiles storage 130, the wireless connection profile may be registered as being available for one or more different operating systems including the second OS 150. It is noted that the storing, exporting and/or registering of the wireless connection profile in the shared profiles storage 130 may be performed, automatically without user interactions, based on user interactions or any combinations thereof.

At block 250, the wireless communication device 101 may be rebooted in the second OS 150 from the first OS 140. At block 255, the shared profiles storage 130 may be accessed and scanned, for example, by the input and export module 153 associated with the second OS 150 to determine whether there is any wireless connection profile in the shared profiles storage 130.

In some embodiments, if it is determined that there is at least one wireless connection profile in the shared profiles storage 130, it may be further determined that the at least one wireless connection profile in the shared profiles storage 130 is registered as being available for the second OS 150. As described above, in some embodiments, the at least one wireless connection profile in the shared profiles storage 130 may be the wireless connection profile stored, for example, by the import and export module 143 responsive to the wireless communication device 101 being booted in the first OS 140.

At block 260, the wireless connection profile may be retrieved from the shared profiles storage 130 responsive to the wireless communication device 101 being booted in the second OS 150 and based on a determination that there is at least one wireless connection profile in the share profiles storage 130 and/or that the at least one wireless connection profile stored in the shared profiles storage 130 is registered as being available for the second OS 150. In some embodiments, the at least one wireless connection profile may be refrained from being retrieved from the shared profiles storage 130 based on a determination that the at least one wireless connection profile is not registered as available for the second OS 150.

At block 265, the at least one wireless connection profile retrieved from the shared profiles storage 130 may be imported to the connection management utility 151 associated with the second OS 150. In some embodiments, the retrieving of the at least one wireless connection profile from the shared profiles storage 130 and/or the importing of the retrieved at least one wireless connection profile may be performed, for example, by the import and export module 153 associated with the second OS 150.

At block 270, a second wireless connection may be automatically established between the wireless communication device 101 booted in the second OS 150 and the access point 160 of the network 170 or one or more other devices of the peer-to-peer networking group 180 using the at least one wireless connection profile retrieved from the shared profiles storage 130. In some embodiments, once the wireless communication device 101 is rebooted in the second OS 150, the second wireless connection may be established without any user intervention.

At block 275, if it is determined at block 255, that there is no wireless connection profile in the shared profiles storage 130 or that the wireless connection profile stored in the shared profiles storage 130 is registered for other OSs and not for the second OS 150, operations for the regular wireless connection establishment, such as ones performed for the first wireless connection, may be performed, prompting user interactions again.

Although only some activities are described with respect to FIG. 2, the methods 200 according to various embodiments may perform other activities, such as operations performed by the transceiver 110, the connection management utilities 141 and 151, or the import and export modules 143 and 153 in FIG. 1, in addition to and/or in alternative to the activities described with respect to FIG. 2.

The methods 200 described herein do not have to be executed in the order described, or in any particular order. Moreover, various activities described with respect to the methods 200 identified herein can be executed in repetitive, serial, heuristic, parallel fashion or any combinations thereof. The individual activities of the methods 200 shown in FIG. 2 can also be combined with each other and/or substituted, one for another, in various ways. Information, including parameters, commands, operands, and other data, can be sent and received between corresponding modules or elements in the form of one or more carrier waves. Thus, many other embodiments may be realized.

In various embodiments, the methods 200 shown in FIG. 2 can be implemented in various devices, as well as in a machine-readable medium, where the methods 200 are adapted to be executed by one or more processors, such as the at least one processor 120. Further details of such embodiments are described below.

Figure 3:
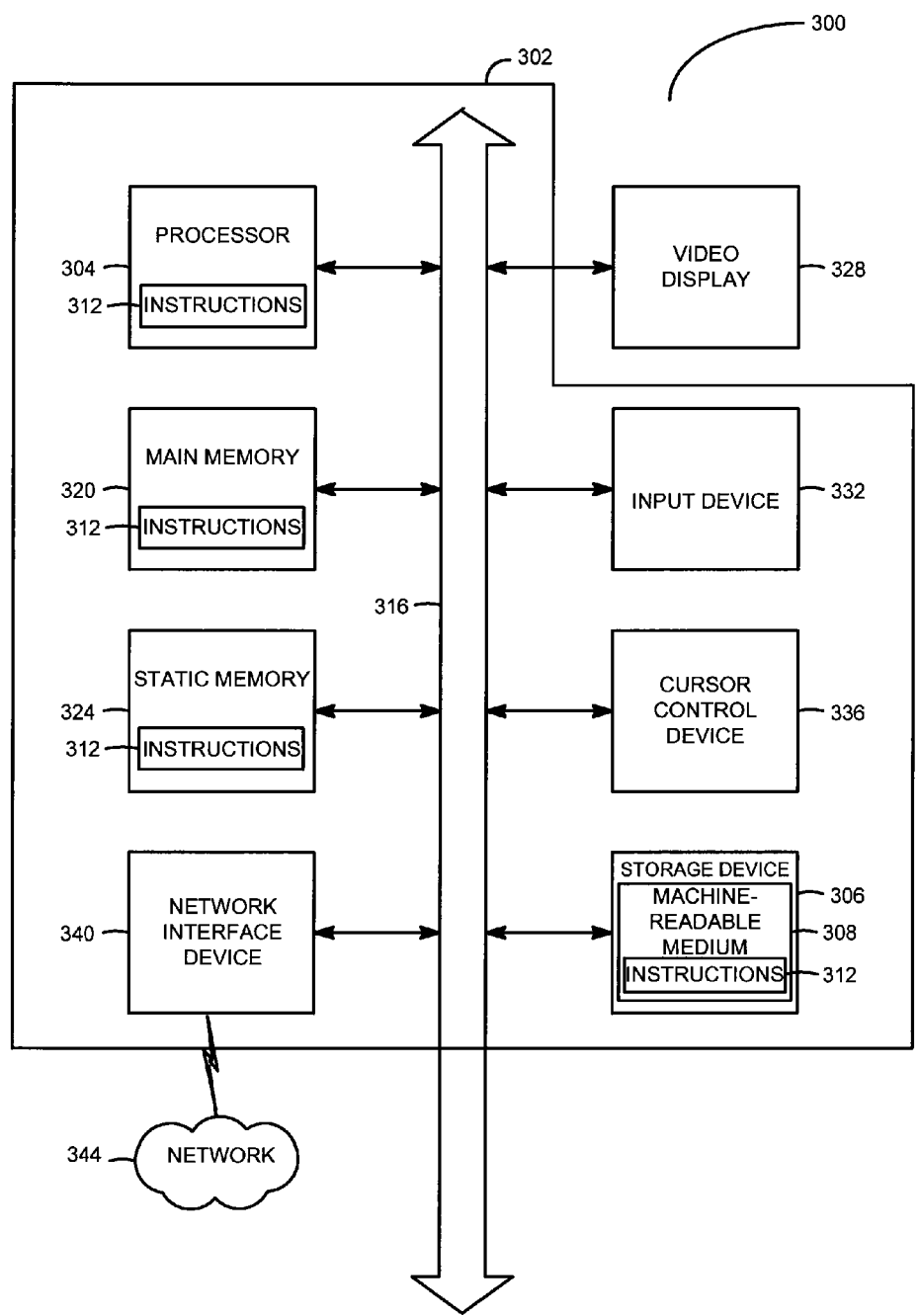
FIG. 3 is a block diagram of a machine in the example form of a communication device in accordance with various embodiments.

For example, FIG. 3 is a block diagram of an article 300 of manufacture, including a specific machine 302, according to various embodiments. Upon reading and comprehending the content of this disclosure, those skilled in the art will understand the manner in which a software program can be launched from a computer-readable storage medium of a communication device to execute the functions defined in the software program.

Those skilled in the art will further understand that various programming languages may be employed to create one or more software programs designed to implement and perform the methods disclosed herein. The programs may be structured in an object-oriented format using an object-oriented language, such as Java or C++. Alternatively, the programs can be structured in a procedure-oriented format using a procedural language, such as assembly or C. The software components may communicate using any of a number of mechanisms well known to those of ordinary skill in the art, such as application program interfaces (API) or interprocess communication techniques, including remote procedure calls (RPC). The teachings of various embodiments are not limited to any particular programming language or environment. Thus, other embodiments may be realized.

Referring to FIG. 3, for example, an article 300 of manufacture, such as a wireless communication device and/or any type of electronic device or system may include one or more processors 304 coupled to a machine-readable medium 308 such as a storage device comprising memory (e.g., removable storage media, as well as any memory including an electrical, optical, or electromagnetic conductor) having instructions 312 stored thereon (e.g., computer program instructions), which when executed by the one or more processors 304 result in the machine 302 performing any of the activities described with respect to the methods herein.

The machine 302 may take the form of a specific computer system having a processor 304 coupled to a number of components directly, and/or using a bus 316. Thus, the machine 302 may be similar to or identical to the wireless communication device 101 of the system 100 shown in FIG. 1.

Returning to FIG. 3, it can be seen that the components of the machine 302 may include main memory 320, static or non-volatile memory 324, and a storage device 306, such as mass storage. Other components coupled to the processor 304 may include an input device 332, such as a keyboard, or a cursor control device 336, such as a mouse. An output device, such as a video display, 328 may be located apart from the machine 302 (as shown), or made as an integral part of the machine 302.

A network interface device 340 to couple the processor 304 and/or other components to a network 344 may also be coupled to the bus 316. The instructions 312 may be transmitted or received over the network 344 via the network interface device 340 utilizing any one of a number of well-known transfer protocols (e.g., HyperText Transfer Protocol and/or Transmission Control Protocol). Any of these elements coupled to the bus 316 may be absent, present singly, or present in plural numbers, depending on the specific embodiment to be realized.

The processor 304, the memories 320, 324, and the storage device 306 may each include instructions 312 which, when executed, cause the machine 302 to perform any one or more of the methods described herein. In some embodiments, the machine 302 may operate as a standalone device or may be connected (e.g., networked) to other machines. In a networked environment, the machine 302 may operate in the capacity of a server or a client machine in server-client network environment, or as a peer machine in a peer-to-peer (or distributed) network environment.

The machine 302 may comprise a personal computer (PC), a tablet PC, a PDA, a cellular telephone, a TV, a set-top box (STB), a web appliance, a network router, a switch or bridge, a server, a client, or any specific machine capable of executing a set of instructions (sequential or otherwise) that direct actions to be taken by that machine to implement the methods and functions described herein. Further, while only a single machine 302 is illustrated, the term "machine" shall also be taken to include any collection of machines that individually or jointly execute a set (or multiple sets) of instructions to perform any one or more of the methodologies discussed herein.

While the machine-readable medium 308 is shown as a single medium, the term "machine-readable medium" should be taken to include a single medium or multiple media (e.g., a centralized or distributed database, and/or associated caches and servers, and/or a variety of storage media, such as the registers of the processor 304, memories 320, 324, and the storage device 306 (e.g., mass storage) that store the one or more sets of instructions 312). The term "machine-readable medium" shall also be taken to include any medium that is capable of storing, encoding or carrying a set of instructions for execution by the machine 302 and that cause the machine 302 to perform any one or more of the methodologies of various embodiments described herein, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility communication providers, in addition to being sold or licensed via traditional channels.

Various embodiments can be implemented in a variety of architectural platforms, operating and server systems, devices, systems, or applications. Any particular architectural layout or implementation presented herein is thus provided for purposes of illustration and comprehension only, and is not intended to limit the various embodiments.

The systems, apparatus, methods and machine-readable medium disclosed herein may operate to share a wireless connection profile(s) stored while a wireless communication device is running in an OS with another OS responsive to the wireless communication device being rebooted in the other OS. By using, for example, the time and space locality of the OSs in which the wireless communication device is booted in, various embodiments may allow a seamless transition between the OSs with respect to establishing a wireless connection of the wireless communication device.

For example, as an illustration, a user may visit a location (e.g., a café or library or certain area of her home or company) with a Hotspot providing an access point of a wireless network, such as Wi-Fi, or with a peer-to-peer networking, such as Wi-Fi Direct, activated. The user may first boot her wireless communication device into the Fast Boot OS, for example, to check her email(s) or to perform an internet search for some information and then decide to reboot the device into the main OS in order to utilize other applications, such as the Microsoft Office suite, and yet want to maintain the ability to access the network without further user interactions. In such a case, various embodiments disclosed herein may obviate the need for the main OS to prompt the user with the full set of connection information for the wireless network or the peer-to-peer networking group that was previously accessed from the Fast Boot OS. A new wireless connection with that access point or peer-to-peer networking group may be automatically established in the main OS. Thus, reduced wait time for the new wireless connection and, in turn, enhanced user experiences may result.

In this Detailed Description, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of ordinary skill in the art upon reviewing the above description.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

What is claimed is:

1. A wireless communication device comprising:
a shared profiles storage to store one or more wireless connection profiles and accessible by a plurality of operating systems (OSs) including a first OS and a second OS, wherein the first OS is different than the second OS; and
at least one processor to run an import and export module, the import and export module configured to retrieve a wireless connection profile from the shared profiles storage responsive to the wireless communication device being booted in the second OS, the wireless connection profile being previously stored in the shared profiles storage responsive to a first wireless connection being established between the wireless communication device and an access point of a wireless network or one or more other devices of a peer-to-peer networking group while the wireless communication device is running in the first OS,
wherein the at least one processor is configured to establish a second wireless connection between the wireless communication device booted in the second OS and the access point or the one or more other devices using the wireless connection profile retrieved from the shared profiles storage.

2. The wireless communication device of claim 1, wherein the at least one processor is configured to automatically establish the second wireless connection between the wireless communication device booted in the second OS and the access point or the one or more other devices using the wireless connection profile retrieved from the shared profiles storage.

3. The wireless communication device of 1, wherein the import and export module is configured to retrieve the wireless connection profile from the shared profiles storage based on a determination that the wireless connection profile is registered for the second OS.

4. The wireless communication device of claim 1, wherein the import and export module is configured to import the network connection profile retrieved from the shared profiles storage to a connection management utility associated with the second OS.

5. The wireless communication device of claim 1, wherein the import and export module is shared by the first and second OSs.

6. The wireless communication device of claim 1, wherein the import and export module is dedicated to the second OS.

7. A wireless communication system comprising:
a wireless transceiver;
a shared profiles storage to store one or more wireless connection profiles accessible by a plurality of operating systems (OSs) including a first OS and a second OS, wherein the first OS is different than the second OS; and
at least one processor to run an import and export module, the import and export module configured to retrieve a wireless connection profile from the shared profiles storage responsive to the wireless communication system being booted in the second OS, the wireless connection profile being previously stored in the shared profiles storage responsive to a first wireless connection being established between the wireless communication system and an access point of a wireless network or one or more devices of a peer-to-peer networking group while the wireless communication system is running in the first OS, the import and export module configured to import the wireless connection profile retrieved from the shared profiles storage to a connection management utility associated with the second OS, wherein the at least one processor is configured to establish a second wireless connection between the wireless communication device booted in the second OS and the access point or the one or more other devices using the wireless connection profile retrieved from the shared profiles storage.

8. The wireless communication system of claim 7, wherein the shared profile storage comprises at least one portion of non-volatile memory including a file system, basic input/output system (BIOS) reserved memory, wireless network interface card (NIC) internal memory, flash memory, battery-backed random access memory (RAM), or any combinations thereof.

9. The wireless communication system of claim 7, wherein the first OS comprises one of a fast boot OS and a main OS, and the second OS comprises the other OS.

10. The wireless communication system of claim 7, wherein the second OS is a different version of the first OS.

11. A method performed by a wireless communication device, the method comprising:

establishing a first wireless connection with an access point of a wireless network or one or more other devices of a peer-to-peer networking group while the wireless communication device is running in a first operating system (OS);

storing a wireless connection profile for the first wireless connection in a shared profiles storage associated with the wireless communication device, the shared profiles storage accessible by a plurality of operating systems;

retrieving the wireless connection profile from the shared profiles storage responsive to the wireless communication device being booted in a second OS different from the first OS; and automatically establishing a second wireless connection between the wireless communication device booted in the second OS and the access point or the one or more other devices using the wireless connection profile retrieved from the shared profiles storage.

12. The method of claim 11, wherein the storing comprises exporting the wireless connection profile from a connection management utility associated with the first OS to the shared profiles storage.

13. The method of claim 11, wherein the storing comprises registering the wireless connection profile as being available for one or more of the plurality of OSs including the second OS.

14. The method of claim 11, wherein the retrieving comprises importing the wireless connection profile from the shared profiles storage to a connection management utility associated with the second OS.

15. The method of claim 11, wherein the retrieving comprises verifying that the wireless connection profile is registered for the second OS.

16. The method of claim 11, further comprising:

refraining from retrieving the wireless connection profile from the shared profiles storage based on a determination that the wireless connection profile is not registered for the second OS.

17. The method of claim 11, wherein the automatically establishing the second wireless connection is performed without user intervention.

18. The method of claim 11, wherein at least one of the first and second wireless network connections is established with the access point in accordance with an IEEE 802.11 communication technique, wherein at least one of the first and second wireless network connections is established with a base station in accordance with an IEEE 802.16 communication technique, or wherein at least one of the first and second wireless network connections is established with an enhanced Node B (eNB) in accordance with an 3GPP LTE communication technique.

19. The method of claim 11, wherein at least one of the first and second wireless connection with the one or more other devices is established in accordance with a Wi-Fi Direct or Bluetooth communication technique.

20. The method of claim 11, wherein the wireless connection profile comprises a network connection profile generated in accordance with at least one of an IEEE 802.11, IEEE 802.16, Wi-Fi Direct, Bluetooth or 3GPP LTE communication technique.

* * * * *